Figure 1:
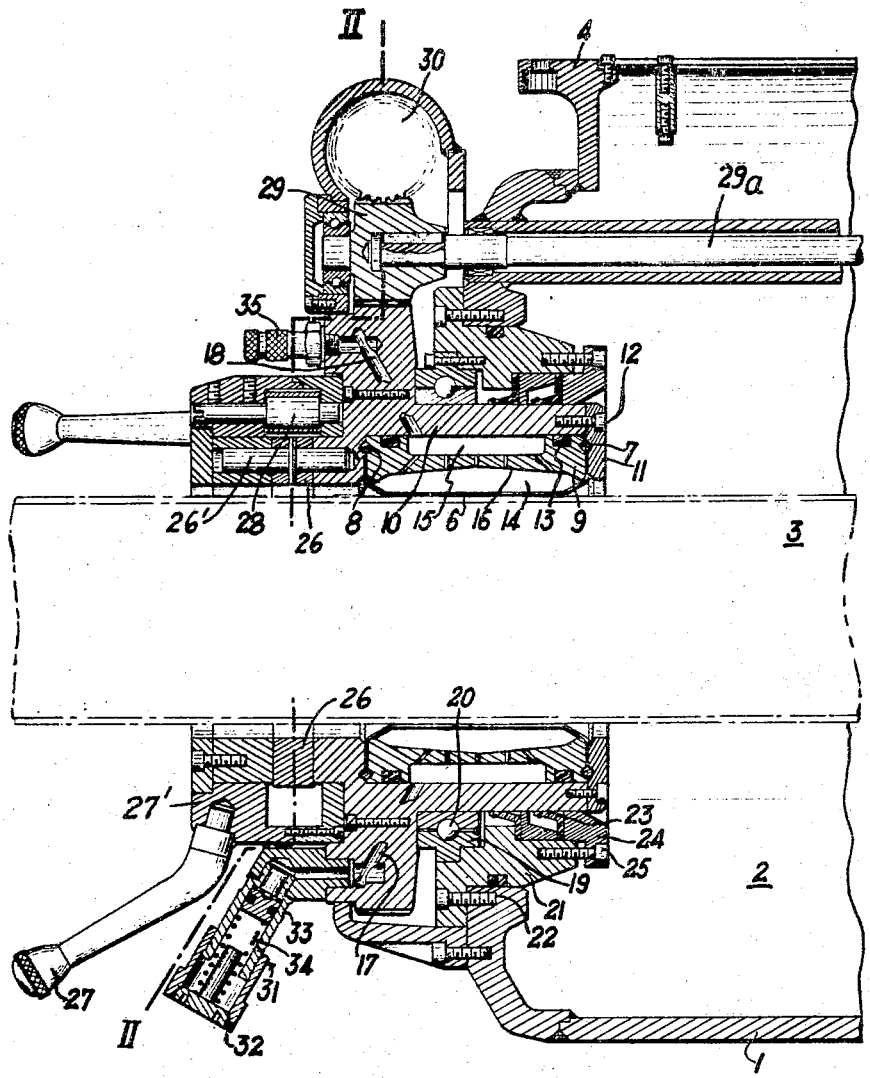

United States Patent Office 3,323,788
Patented June 6, 1967

3,323,788
DEVICE FOR PROVIDING A VACUUM-TIGHT
PASSAGEWAY
René Roudier, Sucy-en-Brie, France, assignor to Commissariat à l'Énergie Atomique, Paris, France
Filed Apr. 21, 1964, Ser. No. 361,496
Claims priority, application France, May 9, 1963,
934,234
4 Claims. (Cl. 269—22)

The present invention relates to a device for providing a vacuum-tight passageway through a vacuum-enclosure, said device comprising a static seal which is designed to be closely applied against a workpiece of any shape, especially of cylindrical shape, having ill-defined tolerances and generally of large size, for the purpose of subjecting said workpiece to treatment within said vacuum enclosure.

It is known that one of the conditions of good operation of a high-vacuum enclosure, especially of the type which is employed for certain welding operations, is that the dimensions of such an enclosure must be relatively small. In the case in which the parts or workpieces to be treated are of large size, it accordingly becomes necessary to cause such workpieces to pass through the enclosure to a partial extent in such manner as to introduce in said vacuum enclosure only that portion of the workpiece which is to undergo the desired treatment. Moreover, it must be made possible for said workpiece to be rotatably mounted about its axis, vacuum-tightness being necessarily ensured betwen the outer atmosphere and that portion of the workpiece which penetrates within the enclosure wall on the one hand and between the vacuum chamber itself and the rotary drive mechanism on the other hand.

The present invention relates to a device for providing a vacuum-tight passageway through an enclosure, especially a vacuum enclosure, said device comprising an inflatable static seal and at least one dynamic seal which satisfies the requisite conditions of vacuum-tightness irrespective of the shape of the workpiece to be treated and the state of surface thereof.

To this end, the device for providing a vacuum-tight passageway through an enclosure for the introduction therein of a workpiece having an irregular shape is characterized in that it comprises in combination a static seal consisting of a cylindrical casing, a coaxial rim designed to delimit an annular space which forms a pressure chamber and a cylindrical elastic membrane which surrounds said workpiece and the edges of which are held between said casing and said rim, means for creating within said chamber an overpressure or reduced pressure which effects respectively the vacuum-tght application of said membrane against said workpiece or against said rim, a mechanical system for locking the workpiece relatively to the casing of the pressure chamber, a dynamic seal disposed between said chamber and said casing and a system for driving said casing in rotation about the axis thereof.

Further characteristic features of the vacuum-tight introduction device considered are especially concerned with the means employed for controlling the pressure in the interior of the pressure chamber and the system employed for the purpose of locking the workpiece in position, and will be more readily apparent from the following description of one example of embodiment which is given solely by way of indication without any limitation being implied.

In the accompanying drawings, FIG. 1 is a vertical sectional view representing a preferred mode of application of the invention.

Figure 2:
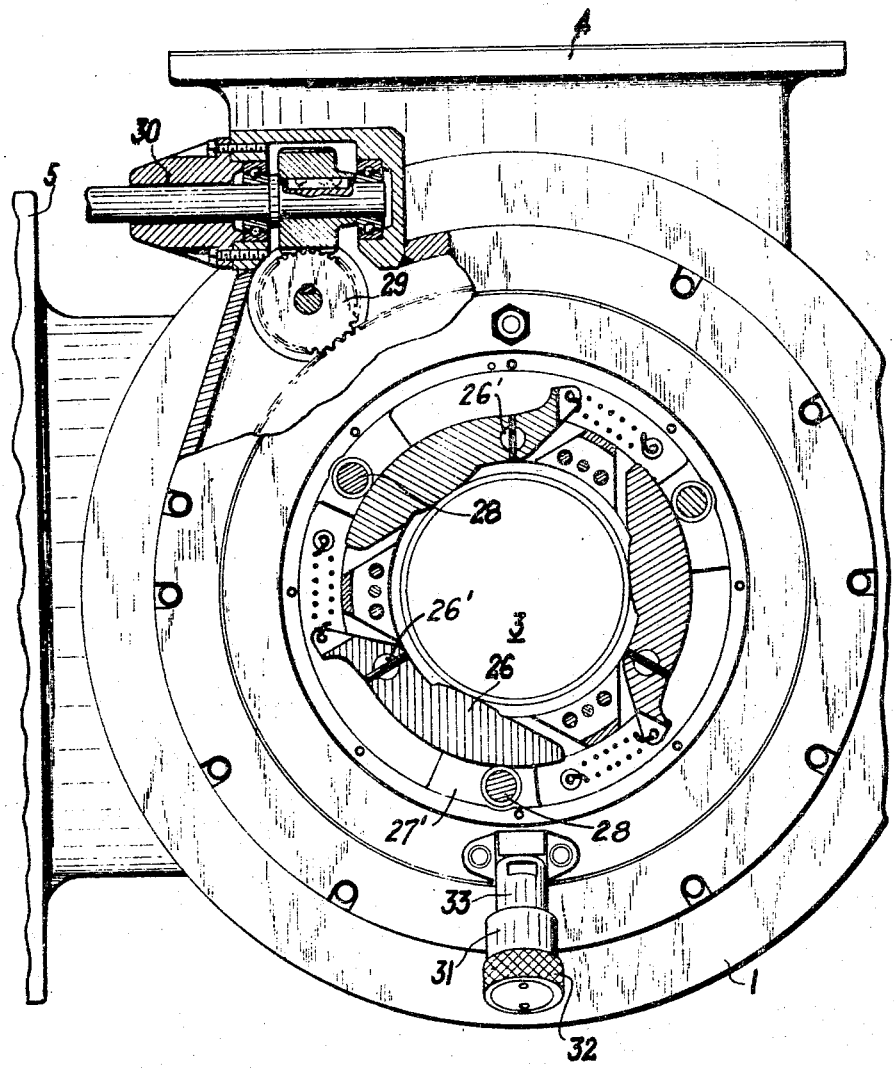

FIG. 2 is a sectional view taken along the line II—II of FIG. 1.

As can be seen from these figures, reference 1 designates the outer wall of an enclosure which delimits a cavity 2 into which partially penetrates a cylindrical workpiece 3 for the purpose of subjecting said workpiece to various processing operations such as, for example, electronic welding. A high vacuum prevails within the cavity 2 and is created by vacuum pumps (not shown), the circulation systems of which are connected to the wall 1 of the enclosure by means of flanges such as the flanges 4 and 5 of this latter (as shown in FIG. 2).

In accordance with the invention, vacuum-tightness for the passage of the workpiece 3 into the interior of the chamber is ensured by means of an elastic membrane 6, the ends of which terminate in two beaded edges such as those designated as 7 and 8 which form O-ring seals. The relative immobilization of the membrane 6 is ensured by clamping the seals 7 and 8 between an annular rim 9 which surrounds the membrane and a sleeve or cylindrical casing 10 against which the rim 9 is held applied by means of an annular flange 11 which is secured by screws such as the screw 12. Vacuum-tightness between the sleeve 10 and the rim 9 which is made integral therewith is ensured by means of O-ring seals 13.

As appears more clearly from FIG. 1, there are thus formed between the membrane 6, the rim 9 and the casing 10 two annular chambers 14 and 15 which surround the workpiece 3 in the region in which this latter penetrates within the cavity 2 of the enclosure 1. The chamber 14, as will become apparent hereinafter, is intended to be either pressurized or depressurized for the purpose of applying the membrane 6 either against the workpiece 3 or against the rim 9 which forms a seating.

To this end, the two chambers 14 and 15 are put into communication by means of a series of orifices such as the orifice 16 through which a suitable fluid is admitted from the chamber 15 into the chamber 14, said fluid being supplied through admission ducts 17 and 18.

The device is additionally fitted with a clamping system which serves to lock the workpiece 3 in position after this latter has been partially introduced in the interior of the cavity 2 which is formed. Moreover, the casing 10 is rotatably mounted about the axis of the workpiece 3 by means of a ball-bearing 19 comprising balls 20 which is rigidly fixed to the wall 1 or more exactly to a cylindrical member or annular flange 21 which is in turn rigidly fixed to the wall 1 by means of fixing screws 22. Vaccum-tightness is suitably ensured at the time of rotation of the casing 10 by means of dynamic seals 23 of known type which are held in position between the annular flange 21 and a support 24 by screws 25.

As will more clearly be seen from FIG. 2, the device for locking the workpiece 3 is composed of a series of three jaws 26 which are pivotally mounted at 26' for rotation into engagement with the workpiece jaws 26 are rotated about pivots 26' by hand-levers 27 which rotate ring 27' and stops 28 for each jaw 26 mounted thereon. Stops 28 engage the outer surfaces of jaws 26 to clamp the workpiece 3 longitudinally and to immobilize this latter relatively to the casing 10. In addition, the rotary drive to said casing is effected by means of a pinion 29 which is driven by a wormscrew 30, said wormscrew being in turn coupled to the drive system which has not been illustrated in the drawings, the pinion 29 being made fast with a rod 29a which serves to transmit the motion thereof, especially to the other extremity of the enclosure (not shown) which is assumed to be fitted with a workpiece 3 which is identical with the workpiece 3, so as to perform within said enclosure the continuous welding of the two parts or workpieces to each other.

The device is finally fitted with a system 31 for pressurizing the fluid which is admitted within the chambers 14 and 15, said system consisting of a knurled cap 32 which is designed to be screwed down to a greater or lesser extent on a connector 33 which is coupled to the duct 18, thereby correspondingly compressing to a greater or lesser extent an internal spring 34. In addition, the apparatus comprises an admission and discharge port 35 which serves to admit or to discharge the fluid so as to pressurize or depressurize the chambers 14 and 15 at the time required.

The operation of the static seal in accordance with the invention can readily be deduced from the foregoing. In a first step, the chambers 14 and 15 are depressurized, thereby applying the elastic membrane 6 against the edge of the rim 9 and freeing a passage of sufficient width to admit the extremity of the workpiece 3. The locking system 26, 28 being then moved into the open position by means of the hand-levers 27, the workpiece 3 is accordingly introduced without difficulty into the cavity of the enclosure and that portion of the workpiece which is to undergo a suitable processing operation is thus caused to penetrate inside said cavity. The workpiece 3 is then locked in this position by moving the hand-levers 27 in the reverse direction and a gaseous fluid under pressure is admitted under pressure into the chambers 14 and 15. The sealing membrane 6 comes into contact with the external surface of the workpiece 3 with a force of application which, in respect of a given pressure of fluid admitted, depends on the setting of the system 31, that is to say on the extent to which the cap 32 is screwed down on the connector 33. As soon as this operation has been effected, remarkable vacuum-tightness is achieved on each side of the wall 1 of the enclosure and especially in the region through which the workpiece 3 passes through said wall.

It can be visualized from the foregoing that the device according to the invention is particularly suitable when the workpiece to be introduced within the enclosure is a tube of large size. It can be observed in addition that, by reason of the large surface area over which the membrane 6 is applied, vacuum-tightness does not in fact depend on the state of surface of said tube and that this latter can equally well have a scored external surface, an ovalized profile or even a counterbore. The operating pressure within the chamber which surrounds the membrane can attain 60 kg./cm.$^2$, and the extent of opening of the passageway can be as great as may be desired.

As will be understood, the invention is not limited in any respect to the form of embodiment which has been described and illustrated but is intended on the contrary to include within its scope all alternative forms.

What I claim is:

1. Device for providing a vacuum-tight passageway through an enclosure for the introduction therein of a workpiece having an irregular shape comprising in combination a static seal consisting of a cylindrical casing, a coaxial rim in said casing forming an annular space and pressure chamber, a cylindrical elastic membrane surrounding said workpiece and secured at its edges between said casing and said rim, means for creating a pressure difference within said chamber providing a vacuum-tight application of said membrane against said workpiece or against said rim, a mechanical system coaxial with said rim for locking the workpiece relative to said casing, a dynamic seal disposed between the enclosure and said casing and means for driving said casing in rotation about the axis thereof.

2. Vacuum-tight device as described in claim 1, said elastic membrane having two beaded edges forming O-ring seals between said cylindrical casing and said coaxial rim.

3. Vacuum-tight device as described in claim 1, said means for creating a pressure difference within said pressure chamber including a connector and a knurled cap screwed on said connector, said connector opening into said chamber.

4. Vacuum-tight device as described in claim 1, said mechanical locking system comprising a plurality of clamping jaws mounted for rotation on said casing, a cam member for each of said jaws, a rotary plate carrying said cam members and hand levers connected to said plate for moving said cam members into engagement with said jaws.

References Cited

UNITED STATES PATENTS

| | | | |
|---|---|---|---|
| 1,836,470 | 12/1931 | Humason et al. | 277—31 |
| 1,942,366 | 1/1934 | Seamark | 277—31 |
| 2,793,040 | 5/1957 | Wilson | 279—4 |
| 2,826,420 | 3/1958 | Klingler | 279—4 |

SAMUEL ROTHBERG, *Primary Examiner.*